United States Patent Office 3,169,290
Patented Feb. 16, 1965

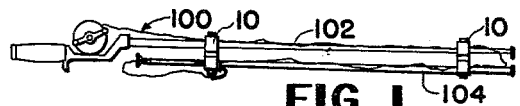
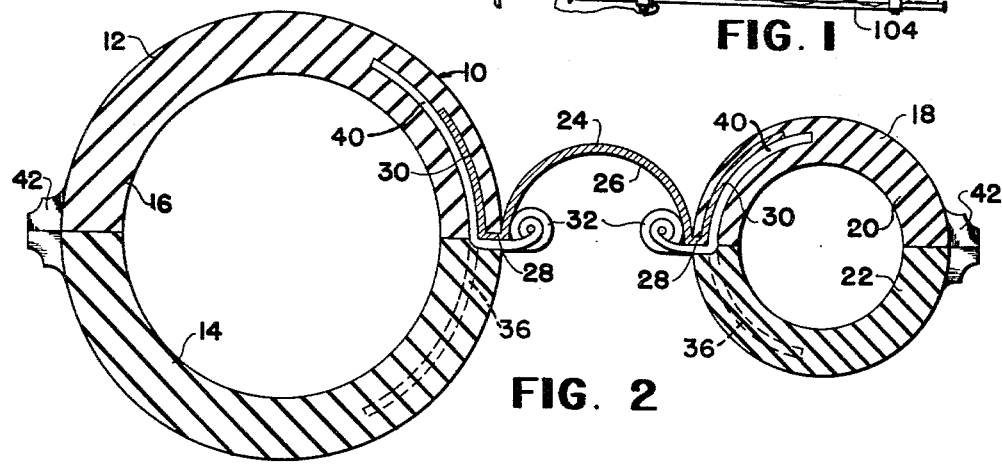
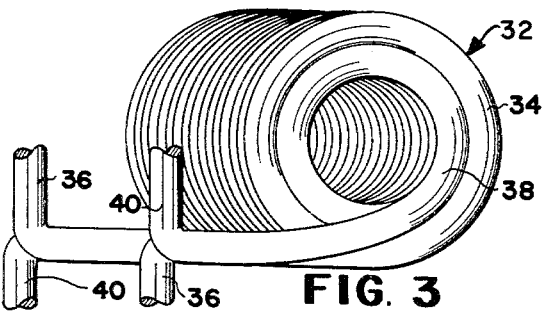
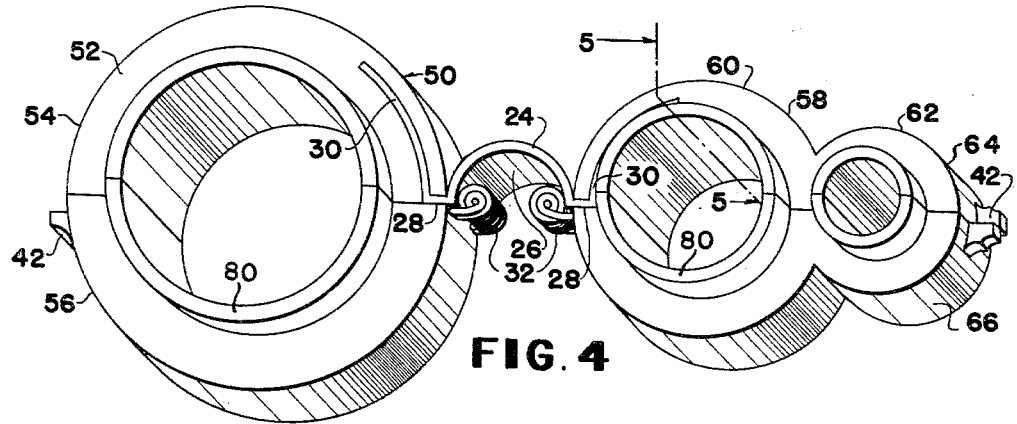
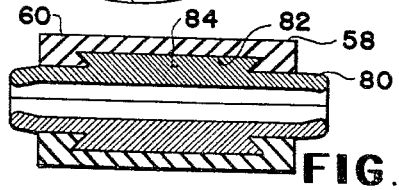

3,169,290
POLE CLIP
Harold F. Snodgrass, 1125 Topeka St., Emporia, Kans.
Filed May 31, 1963, Ser. No. 284,625
7 Claims. (Cl. 24—81)

This invention relates to fishing. In a more specific aspect, this invention relates to an attachment for sectioned fishing poles. Still more specifically, this invention relates to a clip for maintaining the sections of a disassembled fishing pole in an orderly compact easily handled unit.

Sectioned fishing poles are quite common and popular. They can be broken down into relatively short sections which sections are much more convenient to store, transport, etc. than a solid unitary pole. One troublesome aspect in the use of a sectioned fishing pole is the difficulty in handling and storing the individual disassembled sections of the pole. Unless the sections with the line mounted on same are handled very carefully subsequent to disassembly of the pole, the line and sections can become hopelessly entangled often necessitating either a tedious disentangling operation, or in extreme cases, cutting the line away from the sections. Disassembled fishing pole sections, in general, without an arrangement to positively locate or maintain an orderly arrangement thereof comprise a loose bundle of units which is difficult to handle and reassemble. Further, fishing pole sections can be very easily broken or lost either in transit, storage, etc. If a single section of a pole is lost or broken it may very well render the pole unit worthless if a substitute replacement section is not available.

My invention is a clip for releasably securing fishing pole sections in a substantially parallel relationship. The clip of my invention has a plurality of clamp means having portions adapted to engage therearound and releasably secure fishing pole sections therein. Hinge means are provided with each clamp means of the clip for hingedly mounting a portion thereof to adapt same to accept or release a pole section. Preferably, the hinge means which are provided in the clip of my invention include a first coil spring disposed over a second coil spring with each of the coil springs having their respective leg portions secured to the portions of the clamping means. The clamp means of my clip are constructed and arranged relative to each other to maintain the pole sections of a fishing pole in a spaced and substantially parallel relationship.

Another aspect of my invention is the combination of a sectioned fishing pole having a base section and an extension section adapted to be releasably united in end to end extending relationship.

Further, the assembly and disassembly of the pole is simplified. The invention is particularly useful when the line of the fishing pole is left intact on the pole itself. Modifications of the clip of my invention enables it to be used with fishing poles having a plurality of sections. Specific embodiments of my clip can be modified to secure and hold fishing pole sections of varying sizes by means of an insert secured within the clamp elements of a clip.

It is an object of this invention to provide new fishing means.

It is another object of this invention to provide a means to simplify the handling, transporting, and storing of fishing equipment.

It is another object of this invention to provide a clip for releasably securing the disassembled sections of a sectioned fishing pole in a compact parallel relationship.

Yet another object of this invention is to provide a combination of a sectioned fishing pole and a means to releasably secure the sections of the pole in a parallel disassembled relationship.

Another object of this invention is to provide a convenient clamp that in use holds the sections of a sectioned fishing pole therein to insure that line mounted thereon will not become entangled.

Yet another object of this invention is to provide a clip for releasably securing the disassembled sections of a sectional fishing pole in a compact parallel relationship that is provided with an insert which is adapted to accommodate the clip for various sizes of fishing pole sections.

Yet another object of this invention is to provide a removable insert means for a clip adapted to contact and hold the sections of a sectional fishing pole, which can be readily removed from the clip and replaced with another size thereby adapting it to accommodate fishing pole sections of varying size.

Yet another object of this invention is to provide a clip for holding the sections of the sectional fishing pole that is inexpensive and easy to manufacture.

Yet another object of this invention is to provide a small inexpensive clip for use with a sectional fishing pole for releasably securing the disassembled sections in parallel relationship that can be easily and simply installed and removed and stored in a conventional fishing tackle box when not in use.

Other objects and advantages of the invention will be apparent to those skilled in the art from the disclosure set forth herein. Drawings of preferred specific embodiments of the invention accompany and are a part hereof and such are to be understood to not unduly limit the scope of the invention. In the drawings, FIG. 1 is a front elevational view showing the combination of my invention of a sectioned fishing pole and means to secure the sections of the pole in disassembled relationship.

FIG. 2 is a sectional view of a preferred specific embodiment of my invention illustrating the specific construction thereof.

FIG. 3 is a perspective view in enlarged scale showing the structure of the novel spring-biased hinge means used in the preferred specific embodiment of my invention.

FIG. 4 is a perspective view of still another specific embodiment of the pole clip of my invention.

FIG. 5 is a sectional view taken on line 5—5 of FIG. 4 showing the structure of my novel insert means.

The following is a discussion and description of the new clip, and combination fishing pole and clip means of my invention made with reference to the drawings, wherein the same reference numerals are used to indicate the same or similar parts and/or structure. The discussion and description are of preferred specific embodiments of the new clip and fishing pole clip combination of my invention, and it is to be understood that such are not to unduly limit the scope of my invention.

Referring now to the drawings FIGS. 1-3, pole clip 10, and elements and combinations thereof for releasably securing the disassembled sections of a sectional fishing pole in a compact parallel relationship are shown. Pole clip 10 has a first relatively large molded plastic split tubular-shaped clamp element 12 adapted to encircle a relatively large fishing pole section. Tubular-shaped clamp element 12 is composed of two split segments 14 and 16 respectively. A second relatively small molded plastic split tubular-shaped clamp element 18, equal in length to the clamp element 12 and adapted to encircle a relatively small fishing pole section, is provided. Clamp element 18 is composed of two split tubular sections 20 and 22 respectively. Clamp elements 12 and 18 can be made of any suitable material such as plastic, metal, ceramic, etc. and can be made tapered, if desired. Bridging means 24 is provided for securing clamp elements 12 and 18 in spaced parallel relationship. Bridging means 24 is a metal element having a length equal to the length of the clamp elements 12 and 18 and having a center arcuate shaped portion 26, relatively short oppositely extending flat portions 28 joined to the ends of the arcuate portion 26, and arcuate end portions 30 joined to the ends of extending portions 28. As is evident in FIG. 2, arcuate portions 30, which can be perforated if desired, are embedded in split tubular segments 16 of clamp element 12 and split tubular section 20 of clamp element 18. If desired, the bridging element 24 can be provided with a different form than shown and be made of any suitable material. Further, the ends 30 can be secured to the clamp elements by any suitable method as, for example, by welding, soldering, gluing, bolting, etc. The clamp elements can also be formed of metal or other ductile material that is stamped out, or otherwise formed, to the desired shape. Clamp elements 12 and 18 are provided with spring-biased hinge means 32 for maintaining the tubular sections of each of the respective clamp elements together in closed position. Hinge means 32, as shown more clearly in enlarged view of FIG. 3, consists of a first relatively large coil spring 34 having extending end legs 36. The longitudinal axis of the hinge means is positioned parallel and in spaced relationship from the longitudinal axis of the split tubular clamp element. The arcuate portion 26 of bridging means 24 receives the hinge means 32 on the inside, as shown in FIG. 2. A second relatively small coil spring 38 having extending legs 40 is snugly disposed within the coil spring 34. The opposite legs of each respective coil spring 36 and 38 are embedded in the respective opposed sections of the split tubular clamp elements. More specifically, coil spring 34 has extending legs 36, each leg being positioned on each end of the coil spring. One of the legs 36 is joined to one of the tubular split sections of a clamp element and the other leg 36 is joined to the other of the split tubular sections. Coil spring 38 is similarly arranged relative to the sections of the clamp element. Hinge means 32, consisting of two concentric coil springs, therefore has two extending legs at each of its ends. Each of the legs on the respective ends are joined to the top and bottom sections of the clamp element. The hinge means 32 can be secured to the sections of the clamp elements in any suitable manner as, for example, welding, soldering, gluing, bolting, etc. Further, the hinge means can also be secured to the bridging means 24 in any suitable manner at any or all points of contact therebetween, as for example the legs and arcuate portions 30 and 36. The legs of the springs 34 and 38 of clamp element 32 are preferably arranged so that, upon opening the sections of the clamp element, the diameter of the outer coil spring 34 expands and the diameter of the inner coil spring 38 contracts. When the split tubular sections of the clamp elements are closed the coil springs snugly engage each other. This insures that the tubular sections will be perfectly aligned upon closing. The hinge means 32 exert a torque or force to maintain the sections of clamp elements 12 and 18 in a closed position. Handle means 42 are provided on each of the clamp elements 12 and 18 to facilitate the opening of same. The handle means 42 are comprised of adjacent longitudinally offset protrusions on each of the sections of the clamp elements. The shape and position of the protrusions are similar to the protrusions of handle means 42 shown in FIG. 4. In use, the larger clamp element 12 is opened and clipped about the base portion or section of a fishing rod. The clamp element 18 is clamped about another one of the sections of a fishing pole to maintain it in parallel relationship to the base section. The clip can either be left on the pole or taken off while the pole is in use. If left on the pole while it is in use, the clips may be convenient to secure the pole to a convenient support, or to store extra sections of the fishing pole which may become broken during normal fishing activity.

In FIG. 4 is shown another specific embodiment of my clip 50 for releasably securing disassembled sections of a sectional fishing pole in a compact parallel relation. Clip 50 has a relatively large molded plastic split tubular-shaped clamp element 52 adapted to encircle a relatively large fishing pole section. Clamp element 52 is composed of split tubular sections 54 and 56 respectively. A second molded plastic split clamp assembly 58 equal in length to the clamp element 52 and adapted to individually encircle and clamp two pole sections is provided. Clamp element 58 is comprised of two tubular shaped parallel portions 60 and 62. Clamp element 58 is also formed in two split sections 64 and 66 in much the manner that clamp element 52 is formed. A bridging means 24 for securing the clamp elements 52 and 60 in spaced parallel relationship is provided. Bridging element 24 is a metal element of a length equal to the clamp elements and having a center arcuately shaped portion 26, relatively short oppositely extending flat portions 28 joined to the ends of the arcuate portions and arcuate end portions 30 joined to the extending ends of extending portions 28. One of the arcuate end portions 30 is embedded in tubular portion 54 of clamp element 52, and the other of said arcuate end portions 30 is embedded in section 60 of clamp element 58. Spring-biased hinge means 32 are provided for each of clamp elements 52 and 58. The hinge means 32 are the same type as described in connection with the embodiment shown in FIG. 2 and are affixed to the tubular clamp elements in generally the same manner. Handle means 42 are provided on the split clamp elements 52 and 58 to facilitate their opening. Handle elements 42 are of the same structure as depicted in FIG. 2 in the previous embodiment. Clip 50 is adapted in use to be releasably affixed to the base portion of a fishing rod by opening clamp element 52 and securing it to the portion. Two sections of a sectional fishing pole can be placed in the tubular sections 60 and 62 of clamp element 58.

In FIG. 1 is illustrated the clip and sectioned fishing pole combination of my invention. The combination consists of a sectioned fishing pole 100 having a lower base portion 102 and at least one extension section 104 adapted to be united in end to end extending relationship to the base section 102. A means to releasably secure an extending section 104 to the base section 102 in adjacent parallel disassembled relation is provided. This means is clip 10 which was described hereinbefore. If it is desired to hold more than a single extending section of the pole 100, clip 50 can be used instead of clip 10.

In FIG. 5 is shown the structure of my new novel insert means 80. This section taken on line 5—5 of FIG. 3 shows the insert means installed in the specific embodiment of my invention shown in FIG. 4. However, the insert means 80 can be installed in the embodiment shown in FIG. 2, in one or both of the clamp elements. As shown in FIG. 5, tubular portion 60 of clamp element 58 is provided with a groove 82 that is dove-tailed in cross section. A removable split tubular shaped insert means 80 is made of resilient rubber or rubber-like material, and has a length in excess of the length of clamp element 58. Insert 80 has a radially extending central flange portion 84 having a dove-tail cross section, which cross section is adapted to be seated in groove 82. The split sections of insert 82 can be inserted in the split tubular clamp elements of my clip by merely forcing the dove-tail projection into the dove-tail shaped groove. Any other suitable securing means can be used to secure the sections of the insert means 80 to the clamp means. Further, insert 80 can be made of any suitable material as, for example, plastic, foam material, leather, etc. Insert 80 is adapted in use to adjust the clip 50 to fishing pole sections of varying size by the proper selection and utilization of a suitable size of insert.

While I have described and illustrated preferred embodiments of my invention, it is to be understood that the pole clips and combination of fishing pole and pole clip disclosed may be made in other forms herein described or suggested without departing from the spirit of my invention.

I claim:

1. A clip for releasably securing the disassembled sections of a sectional fishing pole in a compact parallel relationship comprising, a first relatively large molded plastic split tubular shaped clamp element, a second relatively small molded plastic split tubular shaped clamp element equal in length to said first clamp element, a bridging means for securing said first and second clamp elements in spaced parallel relationship, said bridging means comprised of a metal element of a length equal to said clamp elements and having a center arcuate shaped portion, relatively short oppositely extending flat portions joined to the ends of said arcuate portion, and arcuate end portions joined to the extending ends of said oppositely extending portions, one of said arcuate end portions being embedded in one of the sections of said first plastic split tubular clamp elements, and the other of said arcuate end portions embedded in one of the sections of said second plastic split tubular clamp element, spring biased hinge means for each of said first and second split tubular clamp elements, each hinge means comprised of a first relatively large coil spring having opposed terminal legs positioned with its longitudinal axis parallel and spaced from the longitudinal axis of said split tubular clamp element, a second relatively small coil spring having opposed terminal legs snugly disposed within said first coil spring, the opposite legs of each respective coil spring being embedded in opposed sections of the tubular split plastic clamp elements respectively, the legs of said springs arranged relative to said springs and clamp elements so that upon opening the sections of the clamp element the diameter of the outer coil spring contracts and the diameter of the outer coil spring expands, said hinge means exerting force to maintain said clamp elements in closed position, handle means on each of said clamp elements to facilitate opening same said handle means comprised of adjacent protrusions on each of the sections of said clamp elements, said clip when in use to releasably secure disassembled sections of a fishing pole in a compact parallel relation.

2. A clip for releasably securing the disassembled sections of a sectioned fishing pole in a compact parallel relationship comprising, a first relatively large split tubular shaped clamp element, a second relatively small split tubular shaped clamp element, a bridging means for securing said first and second clamp elements in spaced parallel relationship, said bridging means comprised of an element having end portions secured to said first and second clamp elements, spring biased hinge means for each said first and second split tubular shaped elements, each hinge means comprised of a first coil spring having opposed terminal leg portions, a second coil spring having opposed terminal leg portions snugly disposed within said first coil spring, the opposite legs of each respective coil spring being secured to the opposed sections of the split tubular clamp elements respectively, handle means on each of said clamp elements to facilitate opening same, said clip being adapted when in use to releasably secure disassembled sections of a fishing pole in a parallel relation.

3. The structure of claim 2 wherein each of said first and second tubular shaped clamp elements are provided with a groove that is dovetail in cross section on the inside cylindrical surface thereof, removable split tubular shaped insert means disposed in said first and second clamp elements, said insert means being made of resilient material and having a longitudinal length in excess of the lengths of said clamp elements, and a radially extending central flange portion on said insert means having a dovetailed cross section shape adapted to be seated in said grooves in said clamp elements.

4. A clip for releasably securing disassembled sections of a sectioned fishing pole in a compact parallel relationship comprising, a first relatively large molded plastic split tubular shaped clamp element, a second molded plastic split clamp element equal in length to said first clamp element comprised of two tubular shaped parallel portions integrally joined and split, a bridging means for securing said first and second clamp elements in spaced parallel relationship, said bridging element comprised of a metal element of a length equal to said clamp elements and having a center arcuate shaped portion, relatively short oppositely extending flat portions joined to the ends of said arcuate portion, and arcuate end portions joined to the extending ends of said oppositely extending portions, one of said arcuate end portions being embedded in one of the sections of said first plastic split tubular clamp element, and the other of said arcuate end portion embedded in one of the sections of said second split plastic clamp element, spring biased hinge means for each of said first and second split clamp elements, each hinge means comprised of a first relatively large coil spring having extending end legs positioned with its longitudinal axis parallel and spaced from the longitudinal axis of said split clamp element, a second relatively small coil spring having extending legs snugly disposed within said first coil spring, the opposite legs of each respective coil spring being embedded in the opposite sections of the split plastic clamp elements associated therewith, the legs of said springs arranged relative to said springs and clamp elements so that upon opening the sections of the clamp element the diameter of the inner coil spring contracts and the diameter of the outer coil spring expands, handle means on each of said split clamp elements to facilitate opening same, said handle means comprised of adjacent longitudinally offset protrusions on each of the sections of said clamp elements, said clip being adapted when in use to releasably secure disassembled sections of the fishing pole in a compact parallel relation.

5. A clip for releasably securing the disassembled sections of a sectioned fishing pole in a compact parallel relationship comprising, a first split tubular shaped clamp element, a second clamp element having two spaced sets of annular gripping surfaces, a bridging means for securing said first and second clamp elements in spaced parallel relationship, said bridging element comprised of a element having its end portions secured to said first and second clamp elements respectively, spring biased hinge means for each of said first and second split clamp elements, each hinge means comprised of a first coil spring having extending legs, a second relatively small coil spring having extending legs, a second relatively small coil spring having extending legs snugly disposed within said first coil spring, the opposite legs of each respective coil spring being secured to the opposed sections of the split clamp elements associated therewith, handle means on each of said clamp elements to facilitate opening same, said clip adapted when in use to releasably secure disassembled sections of a fishing pole in parallel relation.

6. The structure of claim 5, wherein said first and second clamp elements are provided with a groove that is dovetail in cross section on the inside cylindrical surfaces of the tubular portions thereof, removable split tubular shaped insert means disposed in said first and second clamp elements, said insert means being made of resilient rubber and having a length in excess of the length of said clamp element, and a radially extending central portion having a dovetail cross sectional shape adapted to be seated in said groove.

7. A clamp comprising, a plurality of longitudinally spaced clips, each clip having a first relatively large split tubular shaped clamping element, a second relatively small split tubular clamp shaped element, a bridging means to secure said first and second clamp elements into spaced parallel relationship, said bridging means comprised of an element having end portions secured to said first and second clamp elements, spring-biased hinge means for each of said first and second split tubular shaped elements, each hinge means comprised of a first coil spring having extending leg portions, a second coil spring having extending leg portions snugly disposed within first coil spring, the legs of each respective coiled spring being secured to the opposed sections of the split tubular clamp elements respectively, and handle means on each of said clamp elements to facilitate opening same.

References Cited by the Examiner
UNITED STATES PATENTS

| | | | |
|---|---|---|---|
| 281,543 | 7/83 | Mayo | 24—81.3 |
| 848,139 | 3/07 | Stupper. | |
| 1,267,270 | 5/18 | Rheinlander. | |
| 1,768,003 | 6/30 | Roth. | |
| 1,835,632 | 12/31 | Buhrke | 24—249 |
| 2,263,554 | 11/41 | Brach | 24—257 X |
| 2,644,210 | 7/53 | McNamee. | |

DONLEY J. STOCKING, *Primary Examiner*.
JOSEPH S. REICH, *Examiner*.